(12) United States Patent
Young et al.

(10) Patent No.: US 8,545,675 B2
(45) Date of Patent: Oct. 1, 2013

(54) APPARATUS FOR SEPARATING PARTICLES AND METHODS FOR USING SAME

(75) Inventors: Christopher Michael Young, Cincinnati, OH (US); Hasan Eroglu, Liberty Township, OH (US); John Ferney McKibben, West Chester, OH (US); Steven Lee Barnholtz, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/156,413

(22) Filed: Jun. 9, 2011

(65) Prior Publication Data

US 2011/0303373 A1 Dec. 15, 2011

Related U.S. Application Data

(60) Provisional application No. 61/352,989, filed on Jun. 9, 2010.

(51) Int. Cl.
*D21C 9/00* (2006.01)
*D21H 23/00* (2006.01)

(52) U.S. Cl.
USPC .......................................... 162/100; 209/240

(58) Field of Classification Search
USPC .......................................... 162/100; 209/240
See application file for complete search history.

(56) References Cited

U.S. PATENT DOCUMENTS

| | | | |
|---|---|---|---|
| 2,861,299 A * | 11/1958 | Day .............................. | 209/137 |
| 3,482,287 A | 12/1969 | Welling | |
| 4,100,324 A | 7/1978 | Anderson et al. | |
| 5,885,516 A | 3/1999 | Christensen | |
| 6,024,310 A | 2/2000 | Herdman | |
| 6,233,787 B1 | 5/2001 | Eriksen et al. | |
| 6,407,309 B1 | 6/2002 | Schilkowski | |
| 7,037,394 B2 | 5/2006 | Christensen et al. | |
| 7,107,652 B2 | 9/2006 | Thordahl | |
| 7,197,793 B2 | 4/2007 | Thordahl | |
| 7,278,187 B2 | 10/2007 | Petersen | |
| 7,331,089 B2 | 2/2008 | Christensen | |
| 7,383,850 B2 | 6/2008 | Buzanowski et al. | |
| 7,480,966 B2 | 1/2009 | Celli | |
| 7,491,354 B2 | 2/2009 | Andersen | |
| 7,597,200 B2 | 10/2009 | Christensen | |
| 2005/0098910 A1 | 5/2005 | Andersen | |
| 2007/0267329 A1* | 11/2007 | Carvagno et al. ............. | 209/133 |
| 2009/0151886 A1 | 6/2009 | Chan et al. | |

FOREIGN PATENT DOCUMENTS

| | | |
|---|---|---|
| DE | 18 02 161 A1 | 6/1969 |
| EP | 0 224 892 A1 | 6/1987 |
| EP | 1 680 264 B1 | 3/2009 |
| EP | 1 044 303 B1 | 4/2009 |
| FR | 1 005 881 A | 4/1952 |
| WO | WO 87/03626 A1 | 6/1987 |
| WO | WO 00/28138 | 5/2000 |
| WO | WO 2008/145131 A1 | 12/2008 |

OTHER PUBLICATIONS

International Search Report mailed Aug. 3, 2011.

* cited by examiner

*Primary Examiner* — Jacob Thomas Minskey
(74) *Attorney, Agent, or Firm* — C. Brant Cook

(57) ABSTRACT

An apparatus suitable for separating particles and methods for using such apparatus are provided.

9 Claims, 9 Drawing Sheets

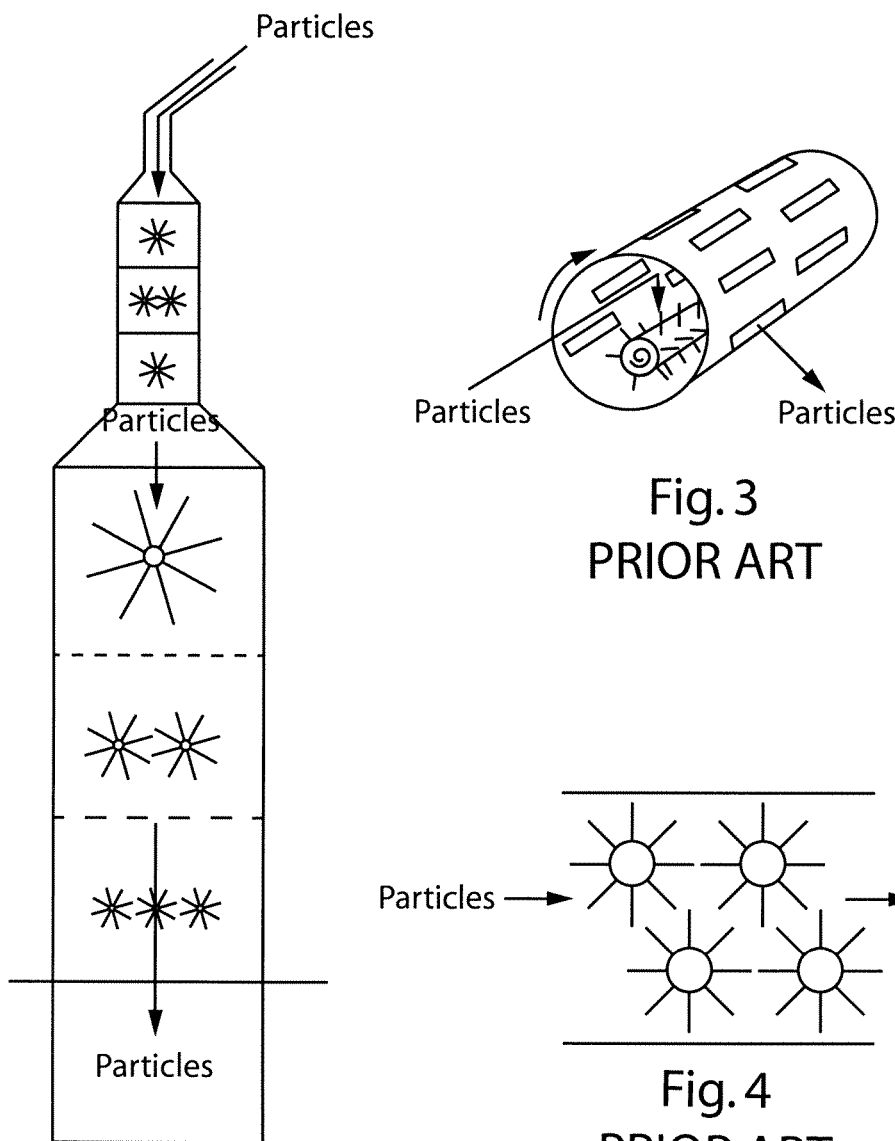

APPARATUS FOR SEPARATING PARTICLES AND METHODS FOR USING SAME

CROSS REFERENCE TO RELATED APPLICATION(S)

This application claims the benefit of U.S. Provisional Application No. 61/352,989 filed Jun. 9, 2010.

FIELD OF THE INVENTION

The present invention relates to an apparatus suitable for separating particles and methods for using such apparatus. More particularly, the present invention relates to an apparatus that utilizes inertial and/or aerodynamic characteristic (for example drag) differences in particles to separate particles into two or more groups.

BACKGROUND OF THE INVENTION

Apparatuses for conveying particles, such as pulp fibers are known in the art. For example, there are numerous air-laying forming heads that utilize pinwheels and/or screens and/or sieves through which all of the particles traveling through the apparatuses pass. These known apparatuses do not separate a portion of the particles from the other particles as the particles are traveling through the apparatuses. As can be seen in FIGS. 1-4, the prior art apparatuses comprise multiple pinwheels and one or more screens or sieves, a single pinwheel and a screen or sieve, multiple pinwheels without screens or sieves. None of these prior art apparatuses separate particles traveling through the apparatus into two or more distinct groups. In other words, none of the prior art apparatuses divert and/or remove only a portion of the particles from the stream of particles traveling through apparatus, especially using inertial and/or aerodynamic characteristic differences in the particles to cause the separation.

FIG. 5 is another prior art apparatus. At first glance, it would appear that the apparatus would work to separate particles into two or more groups. However, upon closer inspection and modeling, the apparatus fails to separate particles into two or more groups as they are traveling through the apparatus. Particles passing through the apparatus described in will hug the surface of the wall as shown in FIG. 5 and continue down along the walls of the S-curve. The rotor (paddle wheel) in the middle of the apparatus functions to provide additional axial mixing of the air and the particles (fibers) to provide a more uniform distribution of the particles, not to separate the particles into two or more groups, especially based on inertial and/or aerodynamic characteristic differences between the particles.

As a result of the designs of the prior art apparatuses, none of them teach or function to separate the particles traveling through them into two or more groups of particles, especially where the separation is based on inertial and/or aerodynamic characteristic differences between the particles traveling through the apparatuses.

Formulators desire a high-throughput apparatus that does not utilize screens and/or sieves or have other obstructions in the main crossflow, while still being able to produce a more uniform distribution of the particles, based on size, density, aspect ratio and other properties associated with the particles.

Accordingly, there is a need for an apparatus that is capable of separating a portion of particles traveling through the apparatus from other particles traveling through the apparatus and methods for using such an apparatus.

SUMMARY OF THE INVENTION

The present invention fulfills the need described above by providing an apparatus capable of separating particles traveling through the apparatus into two or more groups and methods for using such apparatus.

In one example of the present invention, an apparatus for separating particles, the apparatus comprising a housing through which a plurality of particles are capable of traveling and a separator component that separates the plurality of particles into two or more groups of particles as the plurality of particles travels through the apparatus during operation of the apparatus, is provided.

In another example of the present invention, an apparatus for separating particles, wherein particles traveling through the apparatus are separated into two or more groups based on inertial and/or aerodynamic characteristic differences between the particles, is provided.

In even another example of the present invention, an apparatus for separating particles, the apparatus exhibits a ratio of Number of Accepted Particles to Number of Trapped Particles of greater than 2 as measured according to the CFD Test Method described herein, is provided.

In yet another example of the present invention, an apparatus for separating particles, the apparatus exhibits a ratio of Number of Accepted Particles to Number of Trapped Particles of less than 0.5 as measured according to the CFD Test Method described herein, is provided.

In still another example of the present invention, a method for making an article of manufacture, the method comprises the steps of:

a. providing an apparatus for separating particles;

b. supplying a plurality of particles to the apparatus such that the particles are separated into two or more groups of particles as the particles travel through the apparatus during operation of the apparatus;

c. collecting the particles that exit the apparatus on a collection device to form an article of manufacture, is provided.

In yet another example of the present invention, an article of manufacture made by a method according to the present invention, is provided.

In even still another example of the present invention, a method for making a fibrous structure, the method comprises the steps of:

a. providing an apparatus for separating particles;

b. supplying a plurality of particles to the apparatus such that the particles are separated into two or more groups of particles as the particles travel through the apparatus during operation of the apparatus; and c. mixing at least one of the two or more groups of particles with one or more fibrous elements to form a fibrous structure; and d. optionally, forming the fibrous structure on a belt, is provided.

In even still yet another example of the present invention, a fibrous structure made by a method according to the present invention, is provided.

Accordingly, the present invention provides and apparatus and methods for separating particles, articles of manufacture and fibrous structures made by using such apparatus, and methods for making articles of manufacture and/or fibrous structures.

BRIEF DESCRIPTION OF THE DRAWINGS

FIG. 2 is a representation of another prior art apparatus through which particles travel;

FIG. 3 is a representation of yet another prior art apparatus through which particles travel;

FIG. 4 is a representation of even yet another prior art apparatus through which particles travel;

DETAILED DESCRIPTION OF THE INVENTION

Definitions

Figure 1:
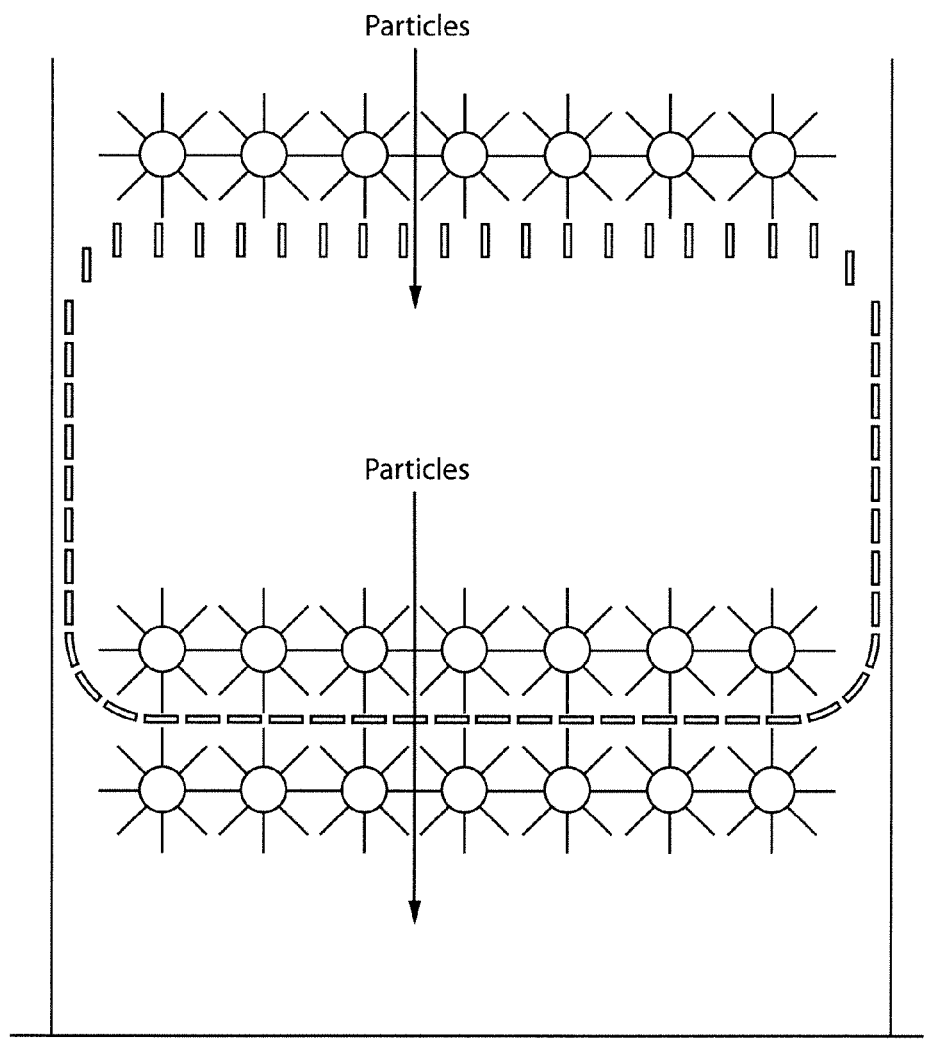
FIG. 1 is a representation of a prior art apparatus through which particles travel.
Figure 5:
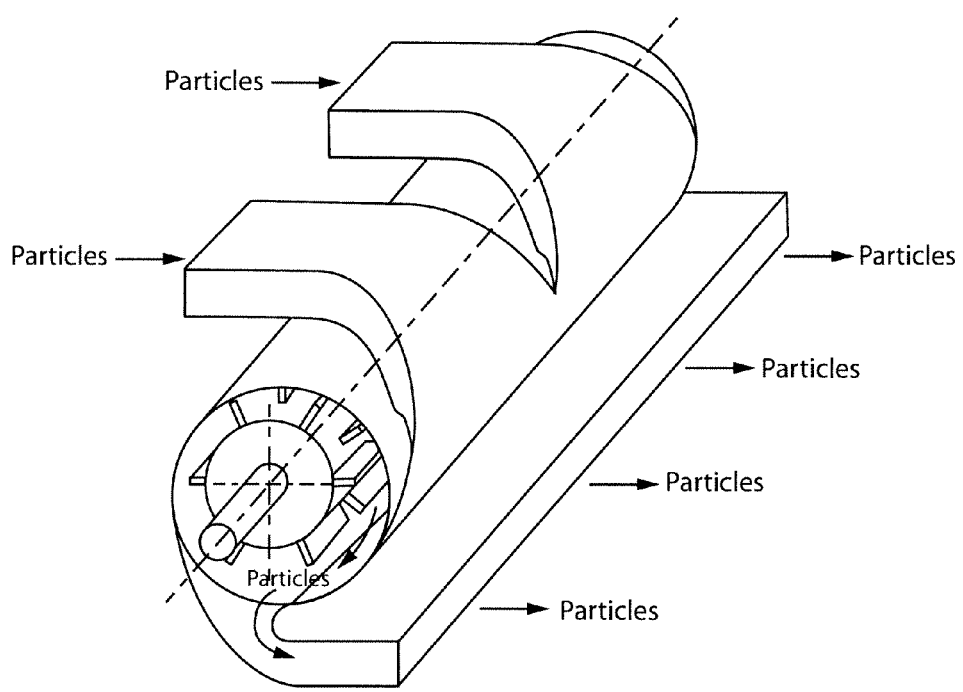
FIG. 5 is a representation of still another prior art apparatus through which particles travel.
Figure 6:
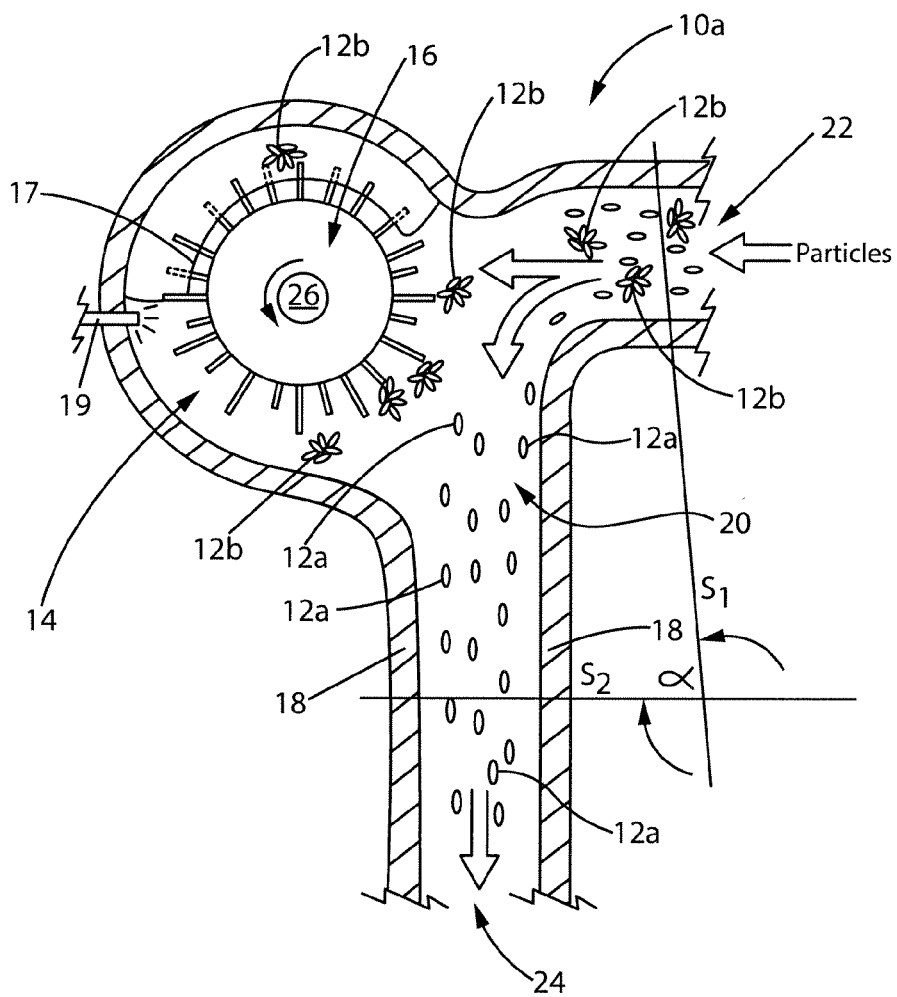
FIG. 6 is a schematic, cross-sectional representation of one example of an apparatus for separating particles according to the present invention.

"Separator component" as used herein means a portion of an apparatus for separating particles, which is capable of diverting a portion (less than all) of the particles traveling through the apparatus such that the diverted particles are separated from the other particles that continue to travel through the apparatus. The separator component is that portion of the apparatus between an imaginary surface $S_1$ normal to the inlet of the apparatus and an imaginary surface $S_2$ normal to the outlet of the apparatus, as shown in FIG. 6. The angle at which the imaginary surfaces $S_1$ and $S_2$ intersect is angle $\alpha$. The separator component may use inertial and/or aerodynamic characteristic differences between the particles traveling through the apparatus to facilitate the separation of the particles into two or more distinct groups.

The separator component may comprise an active component, such as a rotating pinwheel that the diverted particles contact. The separator component may comprise a passive component such as a screen through which the diverted particles pass. In one example, the separator component comprises both a rotating pinwheel and a screen. In another example, the separator component comprises an opening within a wall of the housing of the apparatus through which a portion (less than all) of the particles pass as a result of the particles being separated from the other particles traveling through the apparatus. The opening may lead to a collector unit that stores the diverted particles and/or may lead to a recycling loop to inject the diverted particles, directly or indirectly, back into the apparatus. This feature of recycling may be applied to any of the diverted/separated particles. For example, if the separator component comprises a rotating pinwheel, the particles diverted into the rotating pinwheel may be reduced in size by the rotating pinwheel and then be injected back into the particles that are traveling through the apparatus. In other words, the diverted particles may be temporarily separated from the other particles that continue to travel through the apparatus and may be reintroduced into the particles that are traveling through the apparatus once their characteristics, such as size, have been altered to be substantially similar to those particles that are not diverted by the separator component.

The separator component may comprise a single mechanical device that imparts mechanical energy to the particles.

In one example, the apparatus of the present invention may be void of a screen and/or sieve.

The separator component is capable of separating particles traveling through the apparatus based on their inertial and/or aerodynamic characteristic differences. For example, particles with relatively high inertia and low drag will be separated by the separator component of the apparatus of the present invention from particles with relatively low inertia and relatively high drag.

"Inertia" or "Inertial" as used herein means the tendency for a particle to continue moving in its current direction, irrespective of what the velocity vectors of air are doing around it. As defined, a particle with a high inertia will continue along a straight line path through the bend (turn) at angle $\alpha$ of FIG. 6 and into the separator component. A particle with low inertia will be more susceptible to the air velocity vectors around it and will more easily make the bend (turn) at angle $\alpha$ of FIG. 6 and being diverted and/or separated from the other particles that are continuing to move through the apparatus to the outlet. It could be described as a Force=Mass×Acceleration or Force=(Volume×Density)×Acceleration or Kinetic Energy=½(Mass)×(Velocity) or Kinetic Energy=½(Volume×Density)×(Velocity)$^2$ relationship. The mass of the particle can be increased by increasing the density at a constant volume, volume at a constant density (via particle size or aspect ratio) or by increasing volume and density.

"Aerodynamic characteristic" as used primarily means drag or solely means drag. Increasing the drag of a particle will make it more susceptible to what the velocity vectors of air are doing to it. It is related to the specific surface area of the particle, which as the units of m$^2$/g. Increasing the specific surface area of a particle either by increasing the surface area at a given mass or constant surface area at a decreasing mass with both result in a particle being able to make the bend (turn) at angle $\alpha$ of FIG. 6 easier, since it will more closely follow the flow of air through the apparatus. Further, increasing density decreases specific surface area, increasing aspect ratio decreases specific surface area, and decreasing particle size increases specific surface area.

"Fibrous structure" as used herein means a structure that comprises one or more filaments and/or fibers. In one example, a fibrous structure according to the present invention means an orderly arrangement of filaments and/or fibers within a structure in order to perform a function. Non-limiting examples of fibrous structures of the present invention include paper, fabrics (including woven, knitted, and non-woven), and absorbent pads (for example for diapers or feminine hygiene products).

Non-limiting examples of processes for making fibrous structures include known wet-laid papermaking processes and air-laid papermaking processes. Such processes typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fibrous slurry is then used to deposit a plurality of fibers onto a forming wire or belt such that an embryonic fibrous structure is formed, after which drying and/or bonding the fibers together results in a fibrous structure. Further processing the fibrous structure may be carried out such that a finished fibrous structure is formed. For example, in typical papermaking processes, the finished fibrous structure is the fibrous structure that is wound on the reel at the end of papermaking, and may subsequently be converted into a finished product, e.g. a sanitary tissue product.

The fibrous structures of the present invention may be homogeneous or may be layered. If layered, the fibrous structures may comprise at least two and/or at least three and/or at least four and/or at least five layers.

The fibrous structures of the present invention may be co-formed fibrous structures.

"Co-formed fibrous structure" as used herein means that the fibrous structure comprises a mixture of at least two different materials wherein at least one of the materials comprises a filament, such as a polypropylene filament, and at least one other material, different from the first material, comprises a particle, such as a fiber and/or a granular substance and/or powder. In one example, a co-formed fibrous structure comprises particles, such as fibers, such as wood pulp fibers, and filaments, such as polypropylene filaments.

"Particle" as used herein means a fiber, a granular substance and/or a powder.

"Aspect ratio" as used herein, with reference to a particle, especially a fiber, means the diameter/length of the particle.

"Fibrous element" as used herein means a fiber and/or a filament.

"Fiber" and/or "Filament" as used herein means an elongate particle having an apparent length greatly exceeding its apparent width, i.e. a length to diameter ratio of at least about 10. For purposes of the present invention, a "fiber" is an elongate particle as described above that exhibits a length of less than 5.08 cm (2 in.) and a "filament" is an elongate particle as described above that exhibits a length of greater than or equal to 5.08 cm (2 in.).

Fibers are typically considered discontinuous in nature. Non-limiting examples of fibers include pulp fibers such as wood pulp fibers and synthetic staple fibers such as polyester fibers. The fibers may be monocomponent or multicomponent, such as bicomponent fibers.

Filaments are typically considered continuous or substantially continuous in nature. Filaments are relatively longer than fibers. Non-limiting examples of filaments include meltblown and/or spunbond filaments. Non-limiting examples of materials that can be spun into filaments include natural polymers, such as starch, starch derivatives, cellulose and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments and polycaprolactone filaments. The filaments may be monocomponent or multicomponent, such as bicomponent filaments.

In one example of the present invention, "fiber" refers to papermaking fibers. Papermaking fibers useful in the present invention include cellulosic fibers commonly known as wood pulp fibers. Applicable wood pulps include chemical pulps, such as Kraft, sulfite, soda, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. U.S. Pat. Nos. 4,300,981 and 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking.

In addition to the various wood pulp fibers, other cellulosic fibers such as cotton linters, rayon, lyocell and bagasse can be used in this invention. Other sources of cellulose in the form of fibers or capable of being spun into fibers include grasses and grain sources.

"Sanitary tissue product" as used herein means a soft, low density (i.e. <about 0.15 g/cm3) web useful as a wiping implement for post-urinary and post-bowel movement cleaning (toilet tissue), for otorhinolaryngological discharges (facial tissue), and multi-functional absorbent and cleaning uses (absorbent towels). The sanitary tissue product may be convolutedly wound upon itself about a core or without a core to form a sanitary tissue product roll.

In one example, the sanitary tissue product of the present invention comprises a fibrous structure according to the present invention.

The sanitary tissue products of the present invention may exhibit a basis weight between about 10 $g/m^2$ to about 120 $g/m^2$ and/or from about 15 $g/m^2$ to about 110 $g/m^2$ and/or from about 20 $g/m^2$ to about 100 $g/m^2$ and/or from about 30 to 90 $g/m^2$. In addition, the sanitary tissue product of the present invention may exhibit a basis weight between about 40 $g/m^2$ to about 120 $g/m^2$ and/or from about 50 $g/m^2$ to about 110 $g/m^2$ and/or from about 55 $g/m^2$ to about 105 $g/m^2$ and/or from about 60 to 100 $g/m^2$.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets. In one example, one or more ends of the roll of sanitary tissue product may comprise an adhesive and/or dry strength agent to mitigate the loss of fibers, especially wood pulp fibers from the ends of the roll of sanitary tissue product.

The sanitary tissue products of the present invention may comprises additives such as softening agents, temporary wet strength agents, permanent wet strength agents, bulk softening agents, lotions, silicones, wetting agents, latexes, especially surface-pattern-applied latexes, dry strength agents such as carboxymethylcellulose and starch, and other types of additives suitable for inclusion in and/or on sanitary tissue products.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

"Basis Weight" as used herein is the weight per unit area of a sample reported in lbs/3000 $ft^2$ or $g/m^2$.

"Machine Direction" or "MD" as used herein means the direction parallel to the flow of the fibrous structure through the fibrous structure making machine and/or sanitary tissue product manufacturing equipment.

"Cross Machine Direction" or "CD" as used herein means the direction parallel to the width of the fibrous structure making machine and/or sanitary tissue product manufacturing equipment and perpendicular to the machine direction.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply sanitary tissue product. It is also contemplated that an individual, integral fibrous structure can effectively form a multi-ply fibrous structure, for example, by being folded on itself.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Apparatus For Separating Particles

In one example of the present invention, an apparatus for separating particles comprises a housing through which a plurality of particles are capable of traveling and a separator component through which only a portion of the particles travel during operation of the apparatus.

FIG. 6 shows an apparatus for separating particles 10a in accordance with the present invention. The apparatus 10a is suitable for separating particles, for example particles 12a and particles 12b, which exhibit different inertial and/or aerodynamic characteristic differences. In the present example, the particles 12b may be aggregates of the particles 12a. At least a portion of the particles 12b are separated from the other particles; namely, particles 12a, by a separator component 14. This separation of particles may be evidenced by an increased concentration of a certain particle within one group and an increased concentration of another particle in the other group. For example, as some of the particles 12b are separated from the group of particles 12a and 12b that enter the apparatus 10a, the group of particles from which the particles 12b are separated exhibits an increased concentration of particles 12a and the group of particles that is formed by the diverted and/or separated particles 12b exhibits an increased concentration of particles 12b. In other words, the particles 12b preferentially are removed from the group of particles 12a and 12b that enter the apparatus 10a even though some of the particles 12a may be separated, along with the particles 12b and/or some of the particles 12b may remain with the particles 12a of the original group of particles 12a and 12b that entered the apparatus 10a. The particles 12b may exhibit different inertial and/or aerodynamic characteristic differences than the particles 12a.

Figure 7:
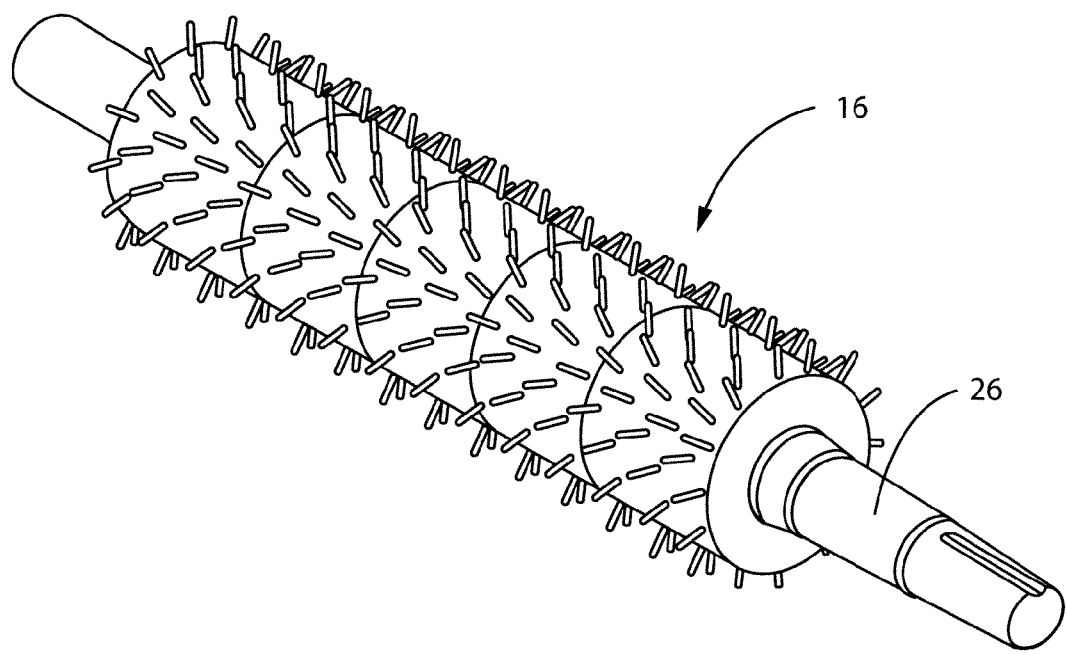
FIG. 7 is a schematic, perspective representation of an example of a pinwheel suitable for use in an apparatus according to the present invention.

The separator component 14 of the apparatus 10a may comprise a macerator, such as a pinwheel 16 as shown in detail in FIG. 7. In one example, the pinwheel 16 is a rotating pinwheel. For example, the pinwheel may rotate at a speed of at least 1000 rpm during operation of the apparatus 10a. In one example, the separator component 14 comprises a portion of the housing 18 of the apparatus. In addition to the pinwheel 16, the separator component 14 may further comprise fins 17, such as stationary fins extending from the housing 18 that help to direct the diverted and/or separated particles, for example particles 12b, into the pinwheel 16. In addition to the fins 17, the separator component 14 may also comprise a source of fluid 19, such as compressed air, that ensures that diverted and/or separated particles, for example particles 12b contact the pinwheel 16. The apparatus 10a is designed such that a portion of the group of particles 12a and 12b, for example particles 12b, are diverted by the separator component 14 such that they are separated from the other particles within the group, for example particles 12a, which continue to travel unfettered through the apparatus 10a.

In addition to the separator component 14, the apparatus 10a further comprises a housing 18 that defines an interior void volume 20 through which the particles 12a, 12b, at least partially travel along a particle flow path as represented by the arrows in FIG. 6. The housing 18 comprises a particle inlet 22 through which the group of particles 12a and 12b are introduced into the apparatus 10a. The particle inlet 22 is positioned upstream of the separator component 14. The housing 18 also comprises a particle outlet 24 through which the particles that have not been diverted and/or separated; namely, the group of particles exhibiting a higher concentration of particles 12a (since the particles 12b have been preferentially diverted and/or separated from group of particles 12a and 12b that were introduced into the apparatus) exit the apparatus 10a. The particle outlet 24 is positioned downstream of the separator component 14. A plurality of particles 12a and 12b enter the apparatus 10a through the particle inlet 22 and exit the apparatus 10a through the particle outlet 24. In one example, particles 12b comprise aggregates of particles 12a, which after being separated from the other particles 12a are altered, such as the aggregates are broken into individual particles 12a and may be reintroduced into the group of particles 12a that are traveling through the apparatus 10a to the particle outlet 24.

The interior void volume 20 defined by the housing 18 of the apparatus 10a between the particle inlet 22 and the particle outlet 24 comprises an angle α, formed by intersecting imaginary surfaces normal to the particle inlet 22 and particle outlet 24, of greater than 20° and less than 160° and/or greater than 45° and less than 110°. In one example, particles 12a travel within the interior void volume 20 from the particle inlet 22 through the angle α to the particle outlet 24 such that they are not diverted and/or separated from the group of particles 12a and 12b by the separator component 14. In one example, particles 12b travel within the interior void volume 20 from the particle inlet 22 and are diverted and/or separated from the group of particles 12a and 12b by the separator component 14. Particles 12b may be reintroduced into the stream of particles that have not been diverted and/or separated by the separator component 14, which continue to travel through the apparatus 10a to the particle outlet 24.

As shown in FIG. 7, the pinwheel 16 comprises a shaft 26 about which the pinwheel 16 rotates.

Figure 8A:
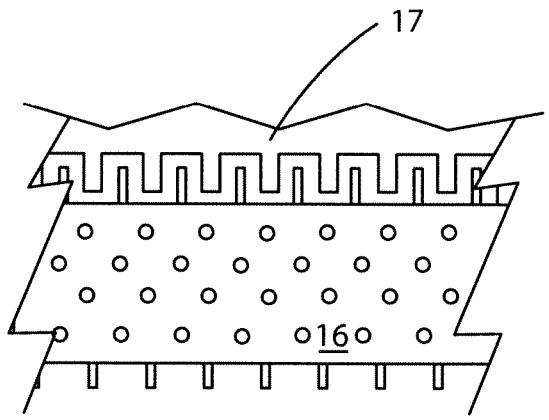
FIG. 8A is a schematic front view representation of an example of a pinwheel and fin arrangement suitable for use in an apparatus according to the present invention.
Figure 8B:
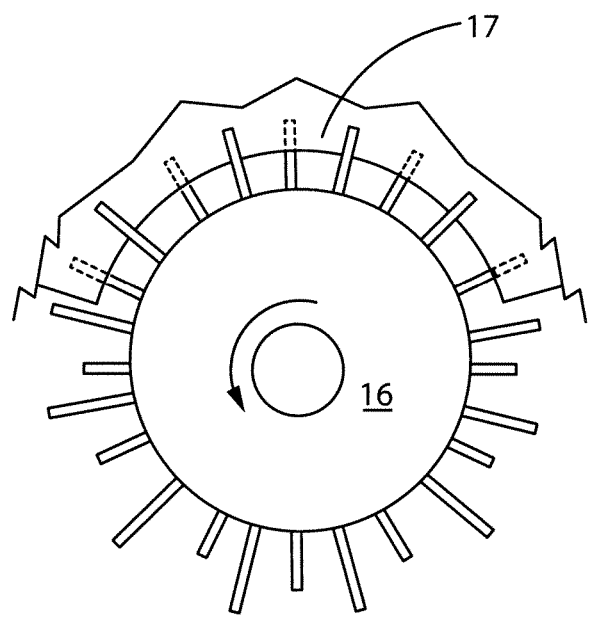
FIG. 8B is a schematic side view representation of pinwheel and fin arrangement shown in FIG. 8A.

FIGS. 8A and 8B illustrate an example of a pinwheel 16 and fin 17 arrangement suitable for use in the apparatus 10a of FIG. 6.

Figure 9:
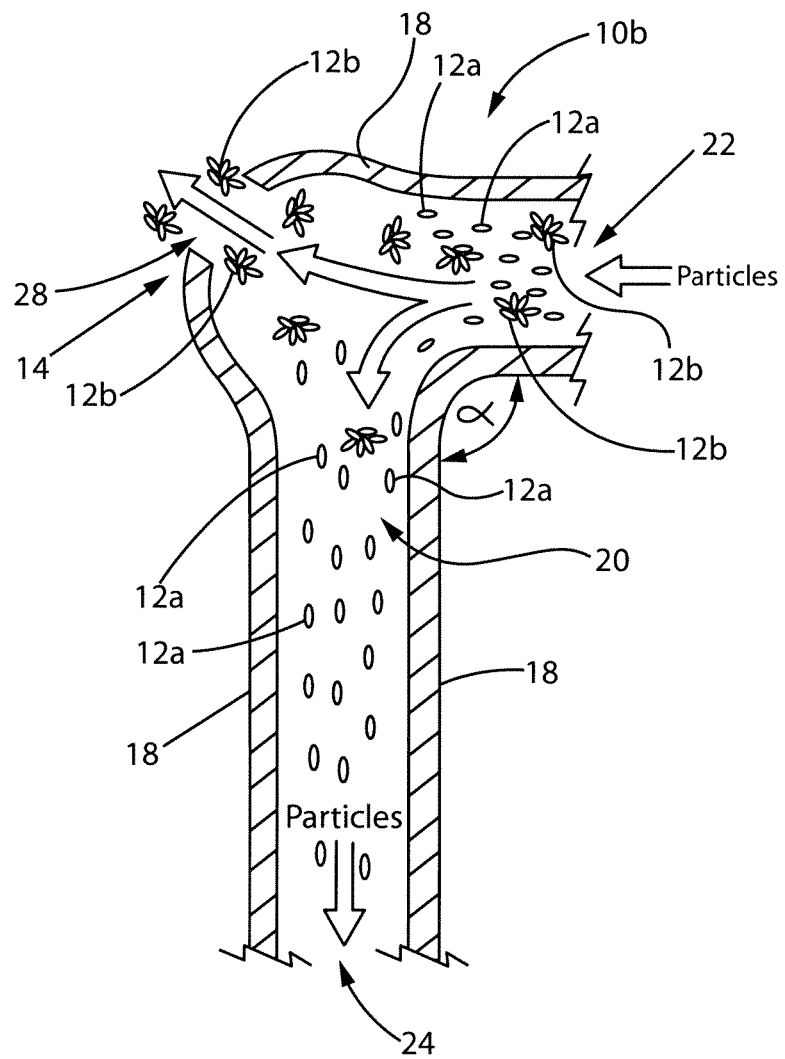
FIG. 9 is a schematic, cross-sectional representation of another example of an apparatus for separating particles according to the present invention.

FIG. 9 illustrates another example of an apparatus for separating particles 10b of the present invention. The apparatus 10b is suitable for separating particles, for example particles 12a and particles 12b, which exhibit different inertial and/or aerodynamic characteristic differences. In the present example, the particles 12b may be aggregates of the particles 12a. At least a portion of the particles 12b are separated from the other particles; namely, particles 12a, by a separator component 14. This separation of particles may be evidenced by an increased concentration of a certain particle within one group and an increased concentration of another particle in the other group. For example, as some of the particles 12b are separated from the group of particles 12a and 12b that enter the apparatus 10b, the group of particles 12a and 12b from which the particles 12b are separated exhibits an increased concentration of particles 12a and the group of particles that is formed by the diverted and/or separated particles 12b exhibits an increased concentration of particles 12b. In other words, the particles 12b preferentially are removed from the group of particles 12a and 12b that enter the apparatus 10b even though some of the particles 12a may be separated, along with the particles 12b and/or some of the particles 12b may remain with the particles 12a of the original group of particles 12a and 12b that entered the apparatus 10b. The particles 12b may exhibit different inertial and/or aerodynamic characteristic differences than the particles 12a.

The separator component 14 of the apparatus 10b may comprise an opening 28 within the housing 18 through which a portion of the group of particles 12a and 12b, for example particles 12b, pass and are thus separated from the other particles, for example particles 12a. The opening 28 may be connected to a collecting device (not shown). The apparatus 10b is designed such that a portion of the group of particles 12a and 12b, for example particles 12b, are diverted by the separator component 14 such that they are separated from the other particles within the group; for example particles 12a, which continue to travel unfettered through the apparatus 10b.

In addition to the separator component 14, the apparatus 10b further comprises a housing 18 that defines an interior void volume 20 through which the particles 12a, 12b, at least partially travel along a particle flow path as represented by the arrows in FIG. 9. The housing 18 comprises a particle inlet 22 through which the group of particles 12a and 12b are introduced into the apparatus 10a. The particle inlet 22 is positioned upstream of the separator component 14. The housing 18 also comprises a particle outlet 24 through which the particles that have not been diverted and/or separated; namely, the group of particles exhibiting a higher concentration of particles 12a (since the particles 12b have been preferentially diverted and/or separated from group of particles 12a and 12b that were introduced into the apparatus) exit the apparatus 10b. The particle outlet 24 is positioned downstream of the separator component 14. A plurality of particles 12a and 12b enter the apparatus 10b through the particle inlet 22 and exit the apparatus 10b through the particle outlet 24. In one example, particles 12b comprise aggregates of particles 12a, which after being separated from the other particles 12a are altered, such as the aggregates are broken into individual particles 12a and may be reintroduced into the group of particles 12a that are traveling through the apparatus 10b to the particle outlet 24.

The interior void volume 20 defined by the housing 18 of the apparatus 10b between the particle inlet 22 and the particle outlet 24 comprises an angle α, formed by intersecting imaginary surfaces normal to the particle inlet 22 and particle outlet 24, of greater than 20° and less than 160° and/or greater than 45° and less than 110°. In one example, particles 12a travel within the interior void volume 20 from the particle inlet 22 through the angle α to the particle outlet 24 such that they are not diverted and/or separated from the group of particles 12a and 12b by the separator component 14. In one example, particles 12b travel within the interior void volume 20 from the particle inlet 22 and are diverted and/or separated from the group of particles 12a and 12b by the separator component 14. Particles 12b may be reintroduced into the stream of particles that have not been diverted and/or separated by the separator component 14, which continue to travel through the apparatus 10a to the particle outlet 24.

Even though the above description has exemplified particles 12b as being aggregates of particles 12a, different particles (different in size, different in composition) may be separated by passing the particles through an apparatus according to the present invention.

In another example of the present invention, an apparatus for separating particles utilizes inertial and/or aerodynamic characteristic differences between the particles traveling through the apparatus to spatially separate the particles into two or more groups based on their inertia. The particles of at least one of the two or more groups of particles formed will then be treated differently than particles of at least one of the other two or more groups of particles. The apparatus may be designed as described herein.

In another example of the present invention, an apparatus for separating particles exhibits a ratio of Number of Accepted Particles to Number of Trapped Particles of greater than 2 and/or greater than 3 and/or greater than 4 and/or greater than 5 and/or less than 0.5 and/or less than 0.3 and/or less than 0.25 and/or less than 0.2 and/or less than 0.05 as measured according to the CFD Test Method described herein at any condition set forth in the test method. The apparatus may be designed as described herein. The apparatus is designed to separate particles based on the particles' inertial and/or aerodynamic characteristic differences.

Table 1 below sets for a range of ratios of Number of Accepted Particles to Number of Trapped Particles at a given density (22, 86, and 150 kg/m³), a given size (0.001, 0.0045, and 0.008 m), and a given aspect ratio (0.01, 0.4, 0.8, and 1.0).

TABLE 1

| #Accepted #Trapped | Size (m) | Aspect Ratio | Density (kg/m³) |
|---|---|---|---|
| 9.17 | 0.001 | 0.01 | 22 |
| 4.25 | 0.0045 | 0.01 | 22 |
| 3.02 | 0.008 | 0.01 | 22 |
| 1.21 | 0.001 | 0.4 | 22 |
| 0.10 | 0.0045 | 0.4 | 22 |
| 0.01 | 0.008 | 0.4 | 22 |
| 0.11 | 0.001 | 0.8 | 22 |
| 0.01 | 0.0045 | 0.8 | 22 |
| 0.06 | 0.008 | 0.8 | 22 |
| 0.01 | 0.001 | 1.0 | 22 |
| 0.36 | 0.0045 | 1.0 | 22 |
| 0.21 | 0.008 | 1.0 | 22 |
| 4.74 | 0.001 | 0.01 | 86 |
| 1.58 | 0.0045 | 0.01 | 86 |
| 0.90 | 0.008 | 0.01 | 86 |
| 0.13 | 0.001 | 0.4 | 86 |
| 0.00 | 0.0045 | 0.4 | 86 |
| 0.06 | 0.008 | 0.4 | 86 |
| 0.00 | 0.001 | 0.8 | 86 |
| 0.23 | 0.0045 | 0.8 | 86 |
| 0.13 | 0.008 | 0.8 | 86 |
| 0.19 | 0.001 | 1.0 | 86 |
| 0.14 | 0.0045 | 1.0 | 86 |
| 0.13 | 0.008 | 1.0 | 86 |
| 3.18 | 0.001 | 0.01 | 150 |
| 0.92 | 0.0045 | 0.01 | 150 |
| 0.45 | 0.008 | 0.01 | 150 |
| 0.01 | 0.001 | 0.4 | 150 |
| 0.06 | 0.0045 | 0.4 | 150 |
| 0.33 | 0.008 | 0.4 | 150 |
| 0.04 | 0.001 | 0.8 | 150 |
| 0.12 | 0.0045 | 0.8 | 150 |
| 0.13 | 0.008 | 0.8 | 150 |
| 0.18 | 0.001 | 1.0 | 150 |
| 0.12 | 0.0045 | 1.0 | 150 |
| 0.13 | 0.008 | 1.0 | 150 |

The particles traveling through the apparatus of the present invention may exhibit a density of 150 kg/m³ or less and/or 86 kg/m³ or less and/or 22 kg/m³ or less. The particles may exhibit an aspect ratio of 1.0 or less and/or 0.8 or less and/or 0.4 or less and/or 0.01 or less. The particles may exhibit a size of 0.008 m or less and/or 0.0045 m or less and/or 0.001 or less.

The apparatus for separating particles of the present invention and/or components thereof may be made from any suitable material known in the art. Non-limiting examples of suitable materials include aluminum, steel, stainless steel, brass, bronze, polycarbonate and mixtures thereof.

Method For Separating Particles

In one example of the present invention, a method for separating a plurality of particles according to the present invention comprises steps of:

a. providing an apparatus for separating particles according to the present invention, and b. supplying a plurality of particles to the apparatus such that the particles are separated into two or more groups of particles as the particles travel through the apparatus during operation of the apparatus.

The apparatus may separate the particles by the inertial and/or aerodynamic characteristic differences between the particles.

In one example, the apparatus for separating particles comprises a housing through which a plurality of particles are capable of traveling and a separator component that is capable of separating the particles into two or more groups during operation.

In one example, the plurality of particles are supplied to the apparatus by a solid particle discretizer, such as a hammer mill.

The particles may exhibit a density of less than 500 kg/m$^3$ and/or less than 300 kg/m$^3$ and/or 150 kg/m$^3$ or less and/or 86 kg/m$^3$ or less and/or 22 kg/m$^3$ or less.

The particles may exhibit a size of 0.0254 m or less and/or 0.008 m or less and/or 0.0045 m or less and/or 0.001 m or less.

The particles may exhibit an aspect ratio (diameter/length) of 1.0 or less and/or 0.8 or less and/or 0.4 or less and/or 0.01 or less.

Method For Making an Article of Manufacture

In one example of the present invention, a method for making an article of manufacture, comprises the steps of:

a. providing an apparatus for separating particles according to the present invention;

b. supplying a plurality of particles to the apparatus such that the particles are separated into two or more groups of particles as the particles travel through the apparatus during operation of the apparatus; and c. mixing at least one of the two or more groups of particles with one or more fibrous elements to form an article of manufacture; and d. optionally, forming the article of manufacture on a belt, such as a patterned belt.

In one example, the step of mixing comprises collecting the particles and fibrous elements on a collection device, such as a belt, for example a patterned belt.

In one example, the particles comprise pulp fibers. In another example, the fibrous elements comprise filaments, such as polypropylene filaments.

The article of manufacture may be a fibrous structure.

In another example of the present invention, a method for making a fibrous structure comprises the steps of:

a. providing an apparatus for separating particles according to the present invention;

b. supplying a plurality of particles to the apparatus such that the particles are separated into two or more groups of particles as the particles travel through the apparatus during operation of the apparatus;

c. combining the particles that exit the apparatus with a plurality of filaments, such as meltblown filaments; and d. collecting the combination of particles and filaments on a collection device to form a fibrous structure.

In one example, the step of combining the particles with the filaments happens in space prior to being collected on the collection device.

The particles may comprise pulp fibers and the filaments may comprise meltblown polypropylene filaments.

Non-limiting Example of Method For Making A Fibrous Structure

Figure 10:
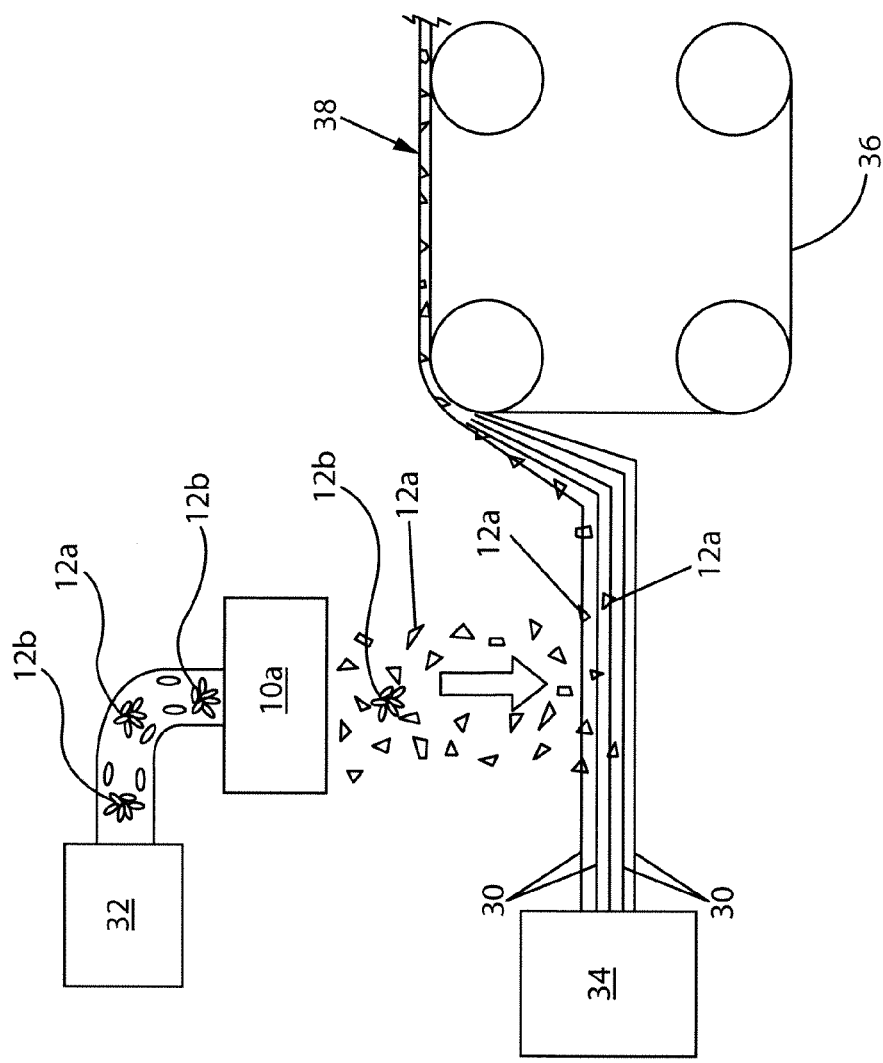
FIG. 10 is a schematic representation of an example of a method for making a fibrous structure according to the present invention.
Figure 11A:
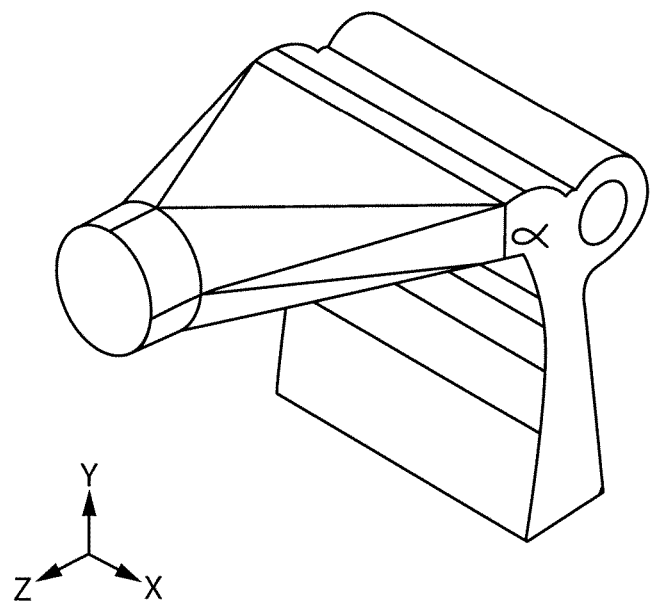
FIG. 11A is an isometric representation of the void volume of an apparatus for separating particles according to the present invention.
Figure 11B:
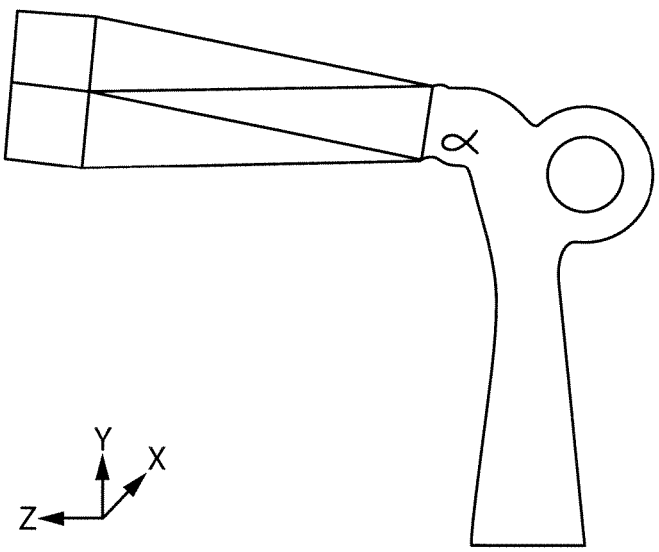
FIG. 11B is a side representation of the void volume of FIG. 11A.

A non-limiting example of a method/process for making a fibrous structure according to the present invention is represented in FIG. 10. The process shown in FIG. 10 comprises the step of mixing a plurality of particles 12*a*, 12*b*, such as fibers, with a plurality of filaments 30. In one example, the particles 12*a*, 12*b*, are wood pulp fibers, such as SSK fibers and/or Eucalyptus fibers, and the filaments 30 are polypropylene filaments. The particles 12*a*, 12*b*, may be combined with the filaments 30, such as by being delivered to a stream of filaments 30 from a hammer mill 32 via an apparatus for separating particles 10*a* according to the present invention to form a mixture of filaments 30 and particles 12*a*, 12*b*, (preferentially particles 12*a*). The filaments 30 may be created by meltblowing from a meltblown die 34. The mixture of particles 12*a*, 12*b*, and filaments 30 are collected on a collection device, such as a belt 36 to form a fibrous structure 38. The collection device may be a patterned and/or molded belt that results in the fibrous structure exhibiting a surface pattern, such as a non-random, repeating pattern. The molded belt may have a three-dimensional pattern on it that gets imparted to the fibrous structure 38 during the process.

In one example of the present invention, the fibrous structures are made using a die comprising at least one filament-forming hole, and/or 2 or more and/or 3 or more rows of filament-forming holes from which filaments are spun. At least one row of holes contains 2 or more and/or 3 or more and/or 10 or more filament-forming holes. In addition to the filament-forming holes, the die comprises fluid-releasing holes, such as gas-releasing holes, in one example air-releasing holes, that provide attenuation to the filaments formed from the filament-forming holes. One or more fluid-releasing holes may be associated with a filament-forming hole such that the fluid exiting the fluid-releasing hole is parallel or substantially parallel (rather than angled like a knife-edge die) to an exterior surface of a filament exiting the filament-forming hole. In one example, the fluid exiting the fluid-releasing hole contacts the exterior surface of a filament formed from a filament-forming hole at an angle of less than 30° and/or less than 20° and/or less than 10° and/or less than 5° and/or about 0°. One or more fluid releasing holes may be arranged around a filament-forming hole. In one example, one or more fluid-releasing holes are associated with a single filament-forming hole such that the fluid exiting the one or more fluid releasing holes contacts the exterior surface of a single filament formed from the single filament-forming hole. In one example, the fluid-releasing hole permits a fluid, such as a gas, for example air, to contact the exterior surface of a filament formed from a filament-forming hole rather than contacting an inner surface of a filament, such as what happens when a hollow filament is formed.

After the fibrous structure 38 has been formed on the collection device, the fibrous structure 38 may be subjected to post-processing operations such as embossing, thermal bonding, tuft-generating operations, moisture-imparting operations, and surface treating operations to form a finished fibrous structure. One example of a surface treating operation that the fibrous structure may be subjected to is the surface application of an elastomeric binder, such as ethylene vinyl acetate (EVA), latexes, and other elastomeric binders. Such an elastomeric binder may aid in reducing the lint created from the fibrous structure during use by consumers. The elastomeric binder may be applied to one or more surfaces of the fibrous structure in a pattern, especially a non-random repeating pattern, or in a manner that covers or substantially covers the entire surface(s) of the fibrous structure.

In one example, the fibrous structure 38 and/or the finished fibrous structure may be combined with one or more other fibrous structures. For example, another fibrous structure, such as a filament-containing fibrous structure, such as a polypropylene filament fibrous structure may be associated with a surface of the fibrous structure 38 and/or the finished fibrous structure. The polypropylene filament fibrous structure may be formed by meltblowing polypropylene filaments (filaments that comprise a second polymer that may be the same or different from the polymer of the filaments in the fibrous structure 38) onto a surface of the fibrous structure 38 and/or finished fibrous structure. In another example, the polypropylene filament fibrous structure may be formed by meltblowing filaments comprising a second polymer that may be the same or different from the polymer of the filaments in the fibrous structure 38 onto a collection device to form the polypropylene filament fibrous structure. The polypropylene filament fibrous structure may then be combined with the fibrous structure 38 or the finished fibrous structure to make a two-ply fibrous structure—three-ply if the fibrous structure 38 or the finished fibrous structure is positioned between two plies of the polypropylene filament fibrous structure. The polypropylene filament fibrous structure may be thermally bonded to the fibrous structure 38 or the finished fibrous structure via a thermal bonding operation.

The process for making fibrous structure 38 may be close coupled (where the fibrous structure is convolutedly wound into a roll prior to proceeding to a converting operation) or directly coupled (where the fibrous structure is not convolutedly wound into a roll prior to proceeding to a converting operation) with a converting operation to emboss, print, deform, surface treat, or other post-forming operation known to those in the art. For purposes of the present invention, direct coupling means that the fibrous structure 38 can proceed directly into a converting operation rather than, for example, being convolutedly wound into a roll and then unwound to proceed through a converting operation.

Test Methods

A. Computational Fluid Dynamics (CFD) Test Method

Computational fluid dynamics (CFD) is used to assess the destination of particles within an apparatus for separating particles. Fluent 12.1.4 software commercially available from ANSYS, Inc. of Ann Arbor, Mich. is used for the CFD modeling. The model inputs of Table 2 are used in the Fluent 12.1.4 software:

TABLE 2

| Model | Settings |
| --- | --- |
| Space | 3D |
| Time | Steady |
| Viscous | Reynolds Stress Model |
| Wall Treatment | Standard Wall Functions |
| RSM Wall Reflection Effects Option | Enabled |
| RSM Wall B.C. Option (solve k) | Enabled |
| Quadratic Pressure-Strain Option | Disabled |
| Heat Transfer | Enabled |
| Solidification and Melting | Disabled |
| Radiation | None |
| Species Transport | Disabled |
| Coupled Dispersed Phase | Disabled |

TABLE 2-continued

| Model | Settings |
| --- | --- |
| Pollutants | Disabled |
| Soot | Disabled |

The material properties used for the Fluent 12.1.4 CFD modeling are incompressible ideal gas for the motive fluid of air, and the particle diameter, density, and aspect ratios are varied in accordance with Table 3.

TABLE 3

| Particle Characteristic | Values |
| --- | --- |
| Aspect Ratio (diameter/length) | 0.01, 0.4, 0.8, 1.0 |
| Density (kg/m$^3$) | 22, 86, 150 |
| Size (m) | 0.001, 0.0045, 0.008 |

Additional information for the air fluid characteristics for the Fluent 12.1.4 CFD modeling are set forth in Table 4.

TABLE 4

| Property | Units | Method | Value(s) |
| --- | --- | --- | --- |
| Density | kg/m$^3$ | incompressible-ideal-gas | Variable |
| Cp (Specific Heat) | j/kg-k | constant | 1006.43 |
| Thermal Conductivity | w/m-k | constant | 0.0242 |
| Viscosity | kg/m-s | constant | $1.7894001 \times 10^{-5}$ |
| Molecular Weight | kg/kgmol | constant | 28.966 |
| Thermal Expansion Coefficient | 1/k | constant | 0 |
| Speed of Sound | m/s | none | Variable |

The majority of wall space, which forms the boundaries of the void volume of an apparatus for separating particles that is being assessed by the Fluent 12.1.4 CFD modeling that do not have flow moving in or out of them, are assumed to be of aluminum composition. The particles used in the Fluent 12.1.4 CFD modeling are assumed to have a normal restitution coefficient of 0.3, a tangent restitution coefficient of 0.3, and a reflect boundary condition for the particles. The wall surfaces near the separator component of the apparatus for separating particles have the same characteristics as the other walls except that these surfaces have a "trap" boundary condition, such that if a particle hits these wall surfaces it will stop moving though the domain.

The inlet boundary condition can either be mass flow specified or velocity specified so long as they are representative of the flows expected to move through the apparatus for separating particles being assessed. The particle injection occurs at the inlet boundary condition as a surface injection. Particle characteristics for the injections are shown in Table 3 above. The aspect ratios of the particles are defined in the discrete model. Exit boundary conditions are specified at pressure outlet.

Energy, Reynolds Stress, Flow, and Turbulence equations are solved to a residual of $1 \times 10^{-3}$ or smaller if steady state flow exists, otherwise a non-steady state analysis should be performed with time increments sufficiently small to achieve the above residuals. The simple scheme of pressure-velocity coupling is used.

To assess an apparatus for separating particles according to this CFD Test Method, Gambit software commercially available from ANSYS, Inc. of Ann Arbor, Mich. or another suitable geometry program is used to input the interior, void volume (void space through which particles flow during operation) of the apparatus for separating particles. Wall surfaces of the apparatus for separating particles whose only intent is to contain the flow are treated by the particles as a reflection boundary condition, while those intended to macerate and/or otherwise impart mechanical energy for the intent of further particle size reduction, or for the purpose of sieving or screening particles would have a trap boundary condition for the particles. If the apparatus one or more additional exits, for further treatment of the separated particles, then the additional exit has a trap boundary condition for the particles. Injections of particles are then introduced into the void volume at the inlet boundary condition as a surface injection, and allowed to pass through the void volume. At the end of the particle injection sequence, a summary report is created that describes the number of particles that are trapped in the void volume ("Number of Trapped Particles") and the number of particles that escape the void volume ("Number of Accepted Particles").

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for separating particles, the apparatus comprising a housing through which a plurality of particles are capable of traveling, a separator component that separates the plurality of particles into two or more groups of particles, and a macerator associated with the apparatus such that after separation by the separator component one of the two or more groups of particles does not contact the macerator during operation of the apparatus; wherein the other of the two or more groups of particles is reintroduced into the group of particles that does not contact the macerator.

2. The apparatus according to claim 1 wherein the separator component comprises a pinwheel.

3. The apparatus according to claim 1 wherein the separator component comprises an opening in the housing through which the separated group of particles passes.

4. The apparatus according to claim 1 wherein the housing comprises a particle inlet upstream of the separator component and a particle outlet downstream of the separator component, wherein the plurality of particles enter the housing through the particle inlet and exit the housing through the particle outlet.

5. The apparatus according to claim 1 wherein the housing defines an interior void volume comprising an angle $\alpha$ formed by intersecting imaginary surfaces normal to the particle inlet and particle outlet of greater than 20° and less than 160°.

6. The apparatus according to claim 5 wherein the angle $\alpha$ is greater than 45° and less than 110°.

7. The apparatus according to claim 1 wherein the particles are selected from the group consisting of: fibers, granular substances, powders and mixtures thereof.

8. The apparatus according to claim 1 wherein the particles comprise fibers.

9. The apparatus according to claim 8 wherein the fibers comprise pulp fibers.

* * * * *